United States Patent [19]

Takahashi et al.

[11] Patent Number: 4,772,960
[45] Date of Patent: Sep. 20, 1988

[54] APPARATUS FOR RECORDING AND/OR REPRODUCING AN INFORMATION SIGNAL COMPRISED OF AT LEAST AN AUDIO SIGNAL AND AN INDEX SIGNAL

[75] Inventors: Takao Takahashi; Hiroshi Okada, both of Tokyo; Akihiro Kikuchi; Yuriko Kishitaka, both of Chiba, all of Japan

[73] Assignee: Sony Corporation, Tokyo, Japan

[21] Appl. No.: 881,946

[22] Filed: Jul. 3, 1986

[30] Foreign Application Priority Data

Jul. 9, 1985 [JP] Japan ................................ 60-150428

[51] Int. Cl.[4] ........................ G11B 5/02; G11B 5/024; G11B 20/10; H04N 5/782
[52] U.S. Cl. ......................................... 360/8; 360/66; 360/18; 360/32; 360/19.1
[58] Field of Search ...................... 360/72.2, 48, 32, 8, 360/66, 57, 18, 19.1

[56] References Cited

U.S. PATENT DOCUMENTS 3,925,815 12/1975 Lemelson ........................... 360/72.2
4,587,577 5/1986 Tsunoda ............................. 360/72.2
4,626,934 12/1986 Yoshida et al. ..................... 360/72.2

OTHER PUBLICATIONS

U.S. Patent Application 06/838,626 filed 3/11/86.

Primary Examiner—Raymond F. Cardillo
Assistant Examiner—Kevin John Fournier
Attorney, Agent, or Firm—Alvin Sinderbrand

[57] ABSTRACT

In an apparatus for recording and/or reproducing an information signal, such as, a PCM (pulse-code modulated) signal and the like, in slant tracks on a recording tape by means of rotary heads, and in which, when an index signal is recorded in, or erased from an area adjacent a part of a slant track in which the PCM signal is recorded, an index area signal which specifies the area for recording or reproducing the index signal is formed on the basis of address data in the reproduced PCM signal. Therefore, the index signal area always has a predetermined positional relation to a recording area of the PCM signal so that when the index signal is recorded in or erased from the index signal area, erasure of the adjacent PCM signal is prevented.

8 Claims, 7 Drawing Sheets

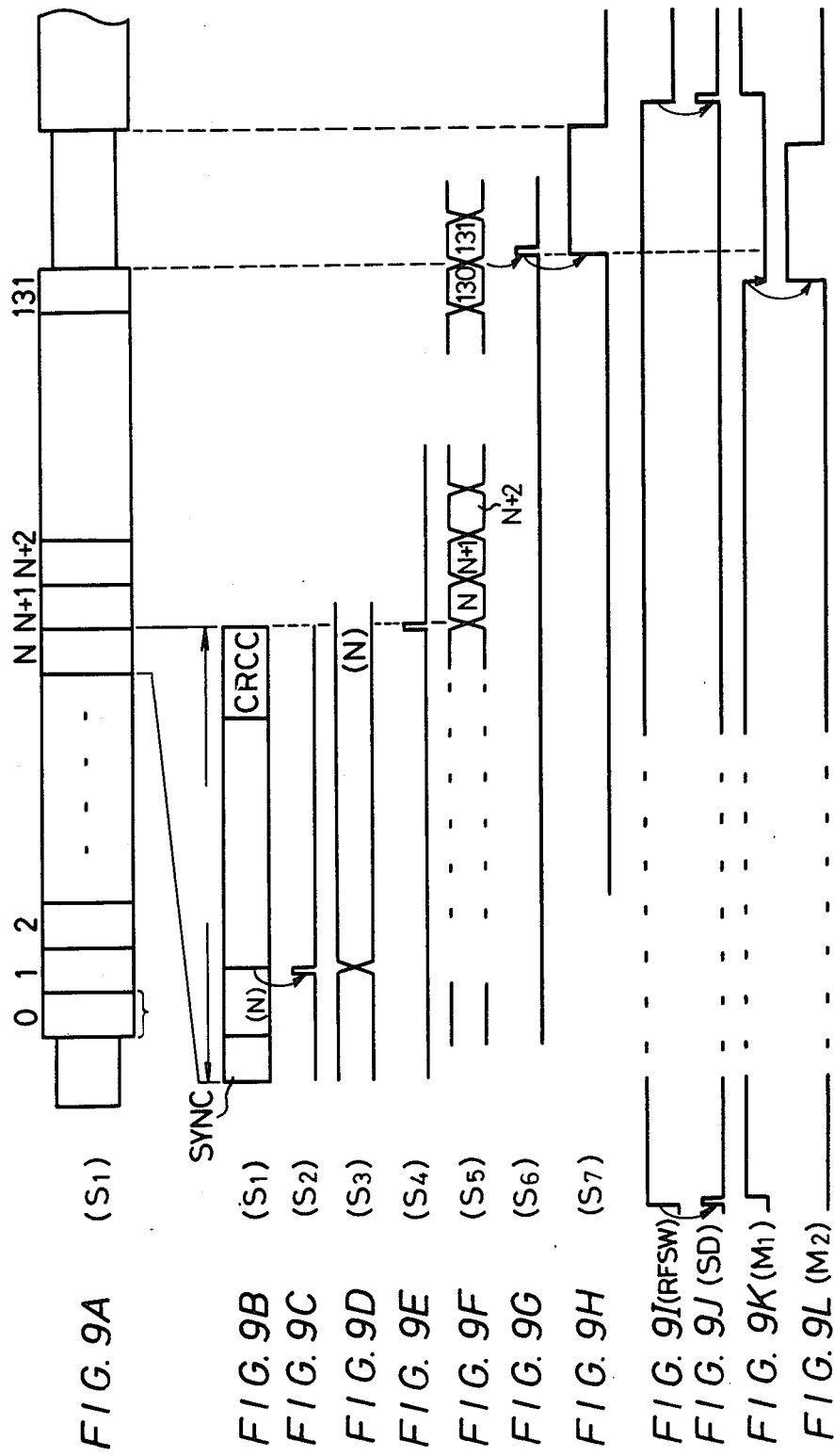

APPARATUS FOR RECORDING AND/OR REPRODUCING AN INFORMATION SIGNAL COMPRISED OF AT LEAST AN AUDIO SIGNAL AND AN INDEX SIGNAL

BACKGROUND OF THE INVENTION

1. Field of the Invention

This invention relates generally to an apparatus for recording and/or reproducing a PCM (pulse-code modulated) audio signal by a rotary head, and more particularly is directed to an apparatus for recording an index signal, such as, a signal indicative of a starting point of a recorded event or program, in an oblique track in a so-called after-recording mode, or for erasing such index signal.

2. Description of the Prior Art

In accordance with the international standardization thereof, an 8 mm video tape recorder can be used in a normal recording mode in which an audio signal is frequency modulated prior to being mixed with a color video signal and then recorded in such a way that the audio signal can be frequency separated from the color video signal upon playback. Further, an optional recording mode can be employed in which the audio signal is pulse-code modulated and recorded in a so-called overscan area which is separate from the main area of each oblique track in which the color video signal is recorded. This latter mode is hereafter referred to as the normal PCM mode.

As is shown on FIG. 1, a rotary head assembly of a typical 8 mm video tape recorder includes recording and reproducing rotary magnetic heads HA and HB. These rotary magnetic heads HA and HB have gaps with different azimuth angles and are mounted on a rotary drum 1 with an angular spacing of 180° therebetween. Rotary heads HA and HB are rotated at a rotational speed equal to the standard frame frequency (30 Hz) in the direction indicated by arrow 3H and protrude slightly from the peripheral surface of the rotary drum 1. A magnetic tape 2 is wrapped around the peripheral surface of rotary drum 1 over an angular extent of 221° and is suitably transported at a constant speed in the direction indicated by an arrow 3T.

Accordingly, tracks 4A and 4B, each having a length corresponding to an angular extent of 221° on the surface of drum 1, are alternately formed on tape 2 by rotary heads HA and HB, respectively, as shown in FIG. 2. In a so-called overscan area AP of each track having an angular extent of 36° measured from a point at which the rotary head HA or HB starts scanning the track 4A or 4B, there is recorded an audio signal corresponding to one field period of the video signal and which has been pulse-code modulated and time compressed. On the succeeding main area AV of each track having an angular extent of 180°, there are recorded a color video signal of one field period, an FM (frequency modulated) audio signal of one field and tracking pilot signals, respectively. The remaining area of each track which has an angular extent of 5° is assigned as a spare area in which the head is disengaged from the tape.

Further, the PCM audio signal can be recorded and reproduced by the 8 mm video tape recorder in a so-called "multi-PCM" or "audio-use" mode in which, as disclosed in detail in U.S. Pat. No. 4,542,419, issued on Sept. 17, 1985 and having an assignee in common herewith, the main recording area AV of each track is also used for recording the PCM audio signal. In such audio-use or multi-PCM mode, the 8 mm video tape recorder becomes exclusively a PCM audio signal recording and/or reproducing apparatus in which PCM audio signals can be recorded in multiple channels. More specifically, as shown on FIG. 3, in the audio-use or multi-PCM mode, the area AV of each track corresponding to the angular range of 180° is divided equally by 5 and the PCM audio signal is recorded in a selected one of these divided portions during scanning of each track. Therefore, the whole area of each track shown on FIG. 2, including the area AP and the area AV, is divided into 6 track areas AP1 to AP6, each corresponding to an angular range or extent of 36°, and first to sixth track channels are formed by the same numbered segments or track areas AP1 to AP6 of the respective skewed tracks 4A,4B,4A, 4B, etc., shown on FIG. 3, whereby a suitably time compressed PCM audio signal can be recorded in any desired channel. For example, the PCM audio signal may be recorded first in the segments or track areas AP1 of the successive tracks 4A,4B, from one end of the tape to the other. Thereafter, the PCM audio signal may be further recorded in segments or track areas AP2 of the successive tracks from one end of the tape to the other. Accordingly, PCM audio signals can be recorded in and reproduced from each of the six channels with the result that, in the audio-use or multi-PCM mode shown on FIG. 3, the tape 2 has a recording time or capacity six times as long as when a PCM audio signal is recorded only in the overscan area AP of each track, as on FIG. 2.

In the case of the multi-PCM mode, if recording and/or reproducing is effected in or from each segment track area, the PCM signal processing circuit used therefor may be the signal processing circuit provided for processing the PCM audio signal recorded in the single channel constituted by the track areas AP in the prior art 8 mm video tape recorder.

The track format of the above mentioned 8 mm video tape recorder in its normal PCM mode will now be described more fully with reference to FIG. 4, in which contact of the rotary head with the tape 2, that is, the starting point of the track, begins at the right-hand side where there is provided a tracing starting area 11 corresponding, in extent, to a 5° rotation angle of a rotary head. At the rear or trailing portion 12 of tracing starting area 11, a period having an angular range or extent of 2.06° and corresponding to 3H of the video signal, where H is the horizontal period, is assigned as a preamble area which will become a clock run-in area synchronized with the succeeding PCM data. Following the preamble or clock run-in area 12, there is provided a PCM data recording area 13 having an angular extent of 26.32° and in which a time compressed PCM audio signal is recorded. A postamble area 14 also having an angular extent of 2.06° (3H) follows the PCM data recording area 13 so as to be used as a back margin area to cope with the displacement of the recording position when the recording is carried out in the so-called after-recording mode. A next area 15 having an angular extent of 2.62° is assigned as a guard band area for separating the video signal area 16 which follows from the PCM data area 13. The video recording area 16 has an angular range or extent of 180° as earlier noted for receiving the recorded video signal of one field period. Next to the area 16, there is provided a head disengaging area 17 having an angular extent of 5° and in which the rotary head is disengaged or separated freely from the magnetic tape.

A track format used in the multi-PCM mode will now be described with reference to FIG. 5 in which it is shown that the format for each segment track area accommodating the PCM audio signal is exactly the same as the format for the PCM audio area AP in the normal 8 mm video tape recorder. Thus, each segment track area in FIG. 5 is formed of a tracing starting area 21, a preamble area 22, a PCM data area 23, a postamble area 24 and a guard band area 25. The same format is assigned to each of the segment track areas AP1 to AP6 on FIG. 3.

Generally, the PCM data is recorded on the tape with the binary code data having a logic level "1" or "0" being modulated to signals of respective frequencies. In the 8 mm video tape recorder, for example, the data having the logic level "1" is modulated to, or represented by a signal having a frequency of 5.8 MHz which is recorded, while the data having the logic level "0" is modulated to, or represented by a signal having a frequency 2.9 MHz which is recorded. In the prior art, for example, U.S. Pat. No. 4,551,771, issued Nov. 5, 1985, only the data having the logic level "1", that is, the signal having the frequency 5.8 MHz, is recorded in each preamble area 12 or 22 and in each postamble area 14 or 24.

A so-called program search method for locating a starting point of an event or program recorded by the 8 mm video tape recorder in the normal PCM mode and the multi-PCM mode has been proposed by a person or persons having a duty of assignment to the assignee of the present application and is described in U.S. patent application Ser. No. 838,626, filed on Mar. 11, 1986. In accordance with such method, an index signal is recorded in, for example, the postamble area 14 or 24 of each track format described above, and this index signal is used to access the starting point of the respective recorded event on the tape or program. Moreover, the index signal can be recorded and/or reproduced by the rotary heads used for the color video and/or PCM audio signals so that stationary recording and reproducing heads are not required for the index signal. Further, since the index signal is recorded in an area 14 or 24 separated from the track areas 13 or 23 and 16 for recording of the PCM data and the video signal, respectively, it is possible to insert or erase the index signal in an after-recording mode.

Although it is described above that the index signal is recorded in the postamble area, strictly speaking, the index signal is recorded in an area spanning the postamble area 14 and the guard band area 15 and has a code length of about 3H, where H is the horizontal interval, as indicated at IDX in FIG. 4. In any case, in order to record the index signal and/or erase the same, it is necessary to form an area specifying signal which specifies this postamble area as an area for an index signal, whereupon, the recording and/or erasing of the index signal must be carried out within the area specified by the area specifying signal.

Such area specifying signal can be generated from a switching signal RFSW (FIG. 6C) which changes-over connections to the two rotary heads HA and HB. In other words, the switching pulse RFSW may be derived from a pulse signal indicating the absolute rotary phases of the rotary heads HA and HB and which is provided by a pulse generator associated with the usual rotary drum motor. The leading and trailing edges of the switching pulse RFSW, which become the times for switching from one to the other of the rotary heads HA and HB, are located at times within the guard band area 15 on the track format. FIGS. 6A to 6D illustrate the relationships among the record tracks HA and HB formed by the two rotary heads HA and HB, switching signal RFSW, and a PCM area signal SA which indicates each PCM segment track area AP. In the multi-PCM mode, both the switching signal RFSW and the PCM area signal SA are phase-shifted by a suitable multiple of 36° relative to the absolute rotary phase (reference phase for the drum phase servo) with the phase relationship shown in FIGS. 6C and 6D, being maintained between signals RFSW and SA. Accordingly, if, for example, a delaying monostable multivibrator is triggered at the leading and trailing edges of switching signal RFSW, it is possible, with proper timing of the resulting pulse, to generate an index area specifying signal SI shown in FIG. 6E.

In the case of the 8 mm video tape recorder, considering the jitter of the VTR driving system, the non-uniformity of the mechanical arrangements of the respective VTRs and the influence of the stretching and shrinking of the magnetic tape, it is possible that data formed in the tracks on the tape may be displaced as much as ±1.5H from the expected positions. Such tolerable error of ±1.5H, is generally accommodated by a rotary head type recording and/or reproducing apparatus.

However, if such tolerable timing error arises because of the above mentioned influences and, after the PCM data and the video signal are recorded, the index signal is recorded in the index area of the recording track or erased therefrom in the after-recording mode, the index area specifying signal generated from the switching signal RFSW, as described above, may result in the index area being displaced by an amount corresponding to the timing error relative to the recording track. Thus, the index signal may be recorded in and/or erased from a part of the PCM audio data area AP or the video signal area AV with the result that a portion of the PCM audio data or the video signal is erased.

OBJECTS AND SUMMARY OF THE INVENTION

Accordingly, it is an object of this invention to provide an improved apparatus for recording and/or reproducing an information signal and which can avoid the above-mentioned problems encountered with the prior art.

It is another object of this invention to provide an improved apparatus for recording and/or reproducing an information signal and which can access a starting point of a recorded event or program on a tape very easily and positively.

It is a further object of this invention to provide an improved apparatus for recording and/or reproducing an information signal and in which, even when a recording track is displaced in the longitudinal direction due to skew, jitter, an adjustment error or the like, a position in predetermined relation to a PCM data track can always be specified as an index signal area.

It is still a further object of this invention to provide an improved apparatus for recording and/or reproducing an information signal which can prevent PCM data from being erased by an index signal because of displacement of the latter in the longitudinal direction of the respective track.

It is yet a further object of this invention to provide an improved apparatus for recording and/or reproducing an information signal, as aforesaid, and which is not limited to an apparatus for recording and/or reproducing a PCM audio signal but can be applied to all apparatus for recording and/or reproducing PCM data.

According to one aspect of the present invention, there is provided an apparatus for recording and/or reproducing, in a slant track format on a recording medium, an information signal comprised of at least an audio signal and an index signal for use in controlling transportation of the recording medium, comprising: audio signal processing means for converting an input audio signal into digital form in such a manner that the audio data for a predetermined period to be recorded in a respective track on said recording medium is grouped as a plurality of data blocks with each data block having block address data for identifying the block number thereof; transducer means connected to said audio signal processing means for recording and/or reproducing the grouped data blocks containing the digitized audio signal for the predetermined length of time in a first part of a respective slant track; index signal generating means for generating an index signal having a predetermined frequency; index area signal generating means for providing an index area signal in response to detected block address data from the grouped data blocks recorded in the first part of the slant track; and control means responsive to the index area signal for supplying said index signal to said transducer means to be recorded by the latter in a second part of the respective slant track which is precisely located adjacent an end of said first part of the respective slant track.

The above, and other objects, features and advantages of the present invention, will become apparent from the following detailed description of a preferred embodiment which is to be read in conjunction with the accompanying drawings, through which the same reference numerals designate like elements and parts.

BRIEF DESCRIPTION OF THE DRAWINGS

FIGS. 9A to 9L are timing charts to which reference will be made in explaining the generation of an index area signal according to this invention.

DESCRIPTION OF THE PREFERRED EMBODIMENT

First, a principle of this invention will be described.

The PCM data for one slant track is generally formed so that an information signal, such as, an audio signal and the like, having a constant time period, is divided into a plurality of blocks and a block synchronizing signal and a block address signal are added to each of the divided blocks.

Figure 7:
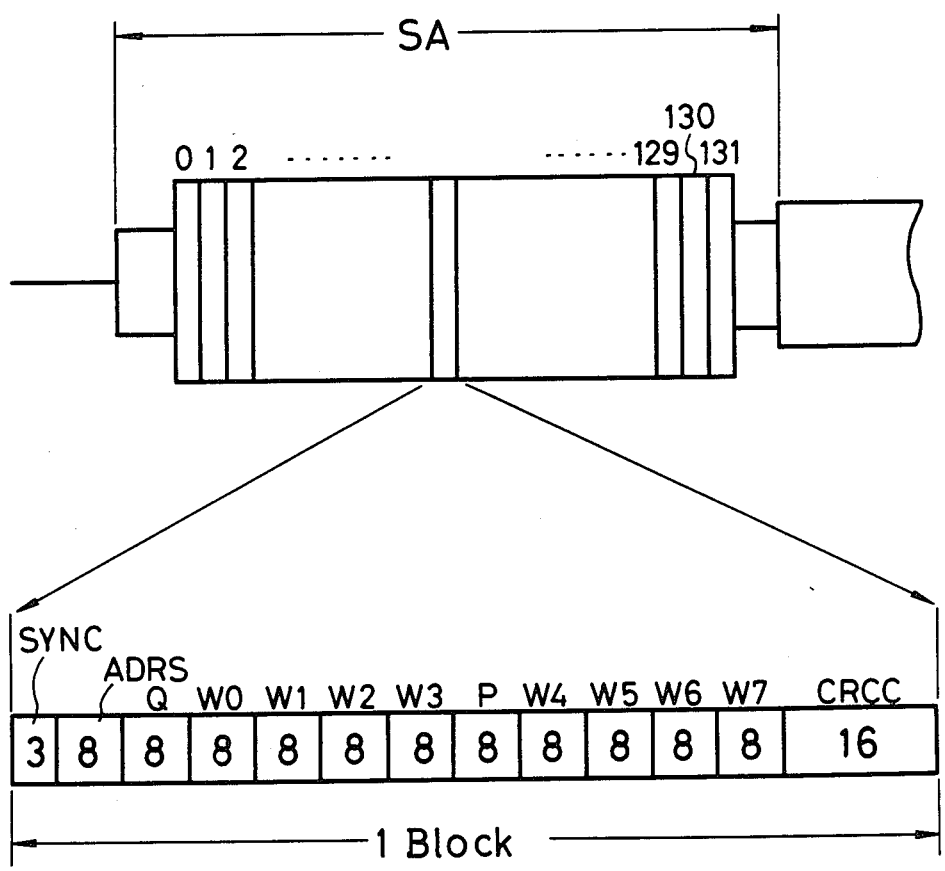
FIG. 7 is a schematic diagram to which reference will be made in explaining the arrangement of the PCM data.

In the PCM audio data of the 8 mm video tape recorder, as shown in FIG. 7, the data of one track area AP or $AP_1$–$AP_6$ is formed of 132 blocks and each block is formed of a block synchronizing signal SYNC of 3 bits, a block address word ADRS of 8 bits, error correction parity words P and Q each of 8 bits, audio data words W0 to W7 each of 8 bits, and an error detection CRC (cyclic redundancy check) code of 16 bits. The CRC code is generated for the words from address word ADRS up to data word W7 (see European Patent Laid-Open Publication No. 94671, published on Nov. 23, 1983 and corresponding to U.S. patent application Ser. No. 494,325, filed on May 13, 1983, now U.S. Pat. No. 4,562,578 and having a common assignee herewith.) Then, the address word ADRS indicates the block number for each block of data recorded in one track. Accordingly, each block address data indicates an absolute position of the respective PCM audio track recorded on the tape. The content of this address data is not changed at all even when the position of the track pattern in which the data is recorded on the tape is displaced from a predetermined position.

Figure 4:
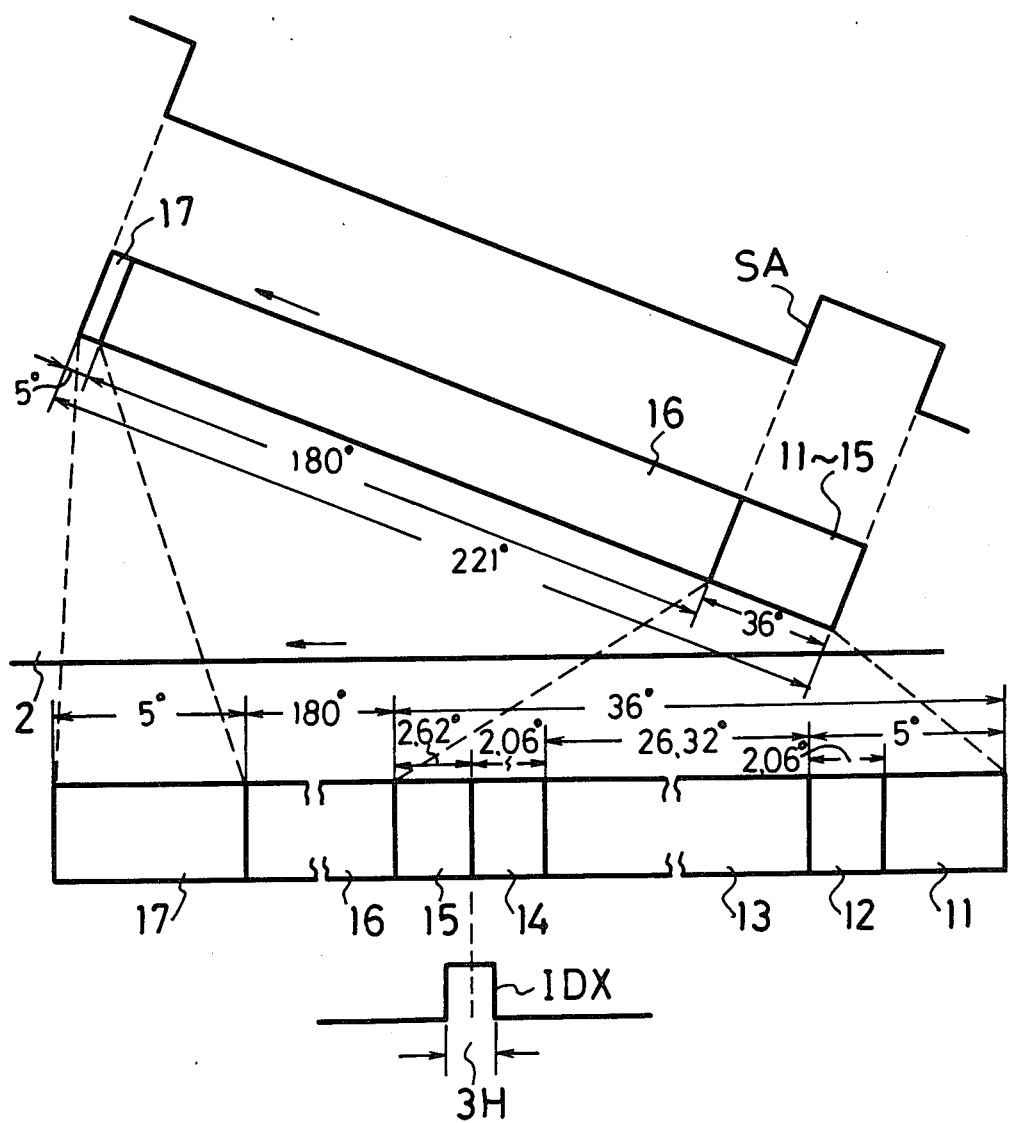
FIGS. 4 and 5 are schematic diagrams showing track formats used in the recording modes of FIGS. 2 and 3, respectively.
Figure 5:
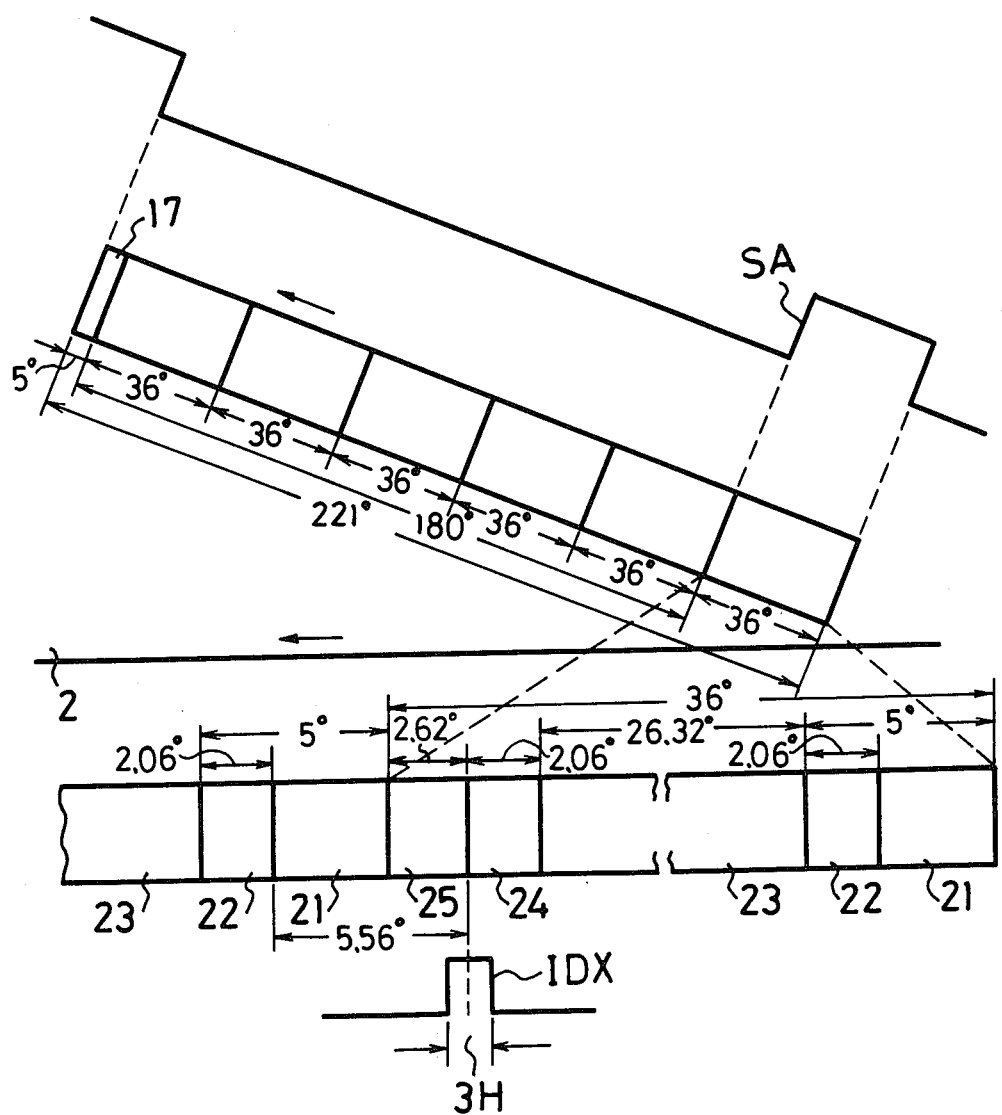

Therefore, generally according to this invention, the block address data included in the PCM data is detected and then the index area specifying signal is formed on the basis of the detected address. Since the index area specifying signal is formed from the address signal contained in the PCM data of the track in and/or from which the index signal is inserted or erased, it is possible to specify the boarder areas between the postamble area 14 or 24 and the guard band area 15 or 25 as the index area, as shown in FIGS. 4 and 5, without the possibility that such index area will overlap the PCM data area 13 or 23 or the video signal area 16.

Figure 8:
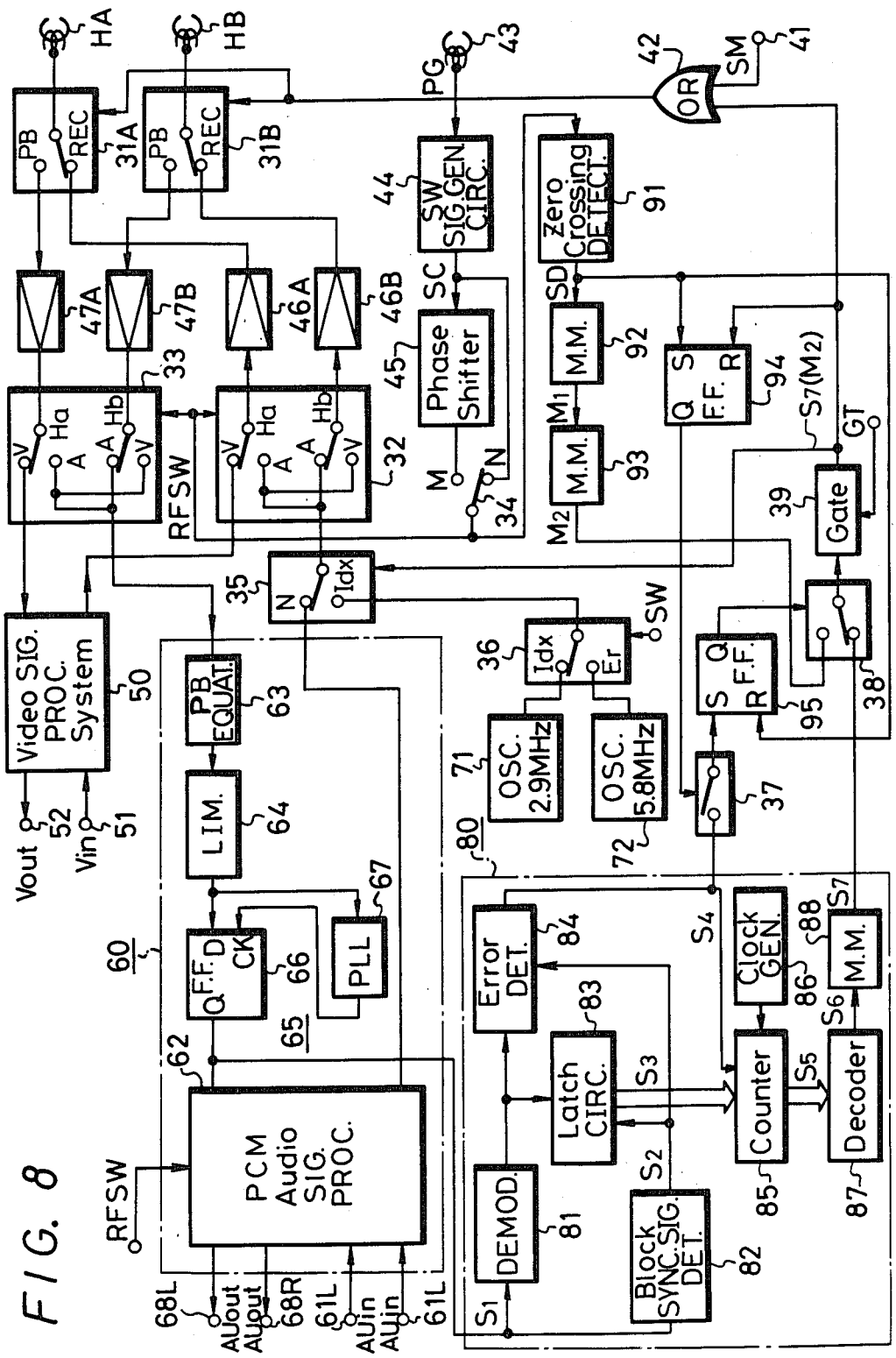
FIG. 8 is a schematic block diagram showing an apparatus for recording and/or reproducing an information signal according to an embodiment of this invention.

Referring in detail to FIG. 8, it will be seen that the apparatus there shown for recording and/or reproducing PCM signals according to this invention is applied to an 8 mm video tape recorder and includes recording and/or reproducing change-over switching circuits 31A and 31B to which a recording or reproducing switching signal SM from a terminal 41 is applied through an OR gate 42. Each of switching circuits 31A and 31B engages a recording terminal REC upon recording and is changed-over to engage a playback terminal PB upon reproducing.

Rotary head change-over switching circuits 32 and 33 are operated by head switching signal RFSW to be alternately disposed in the positions shown in full lines and in dotted lines respectively, at every ½ revolution of the rotary recording/reproducing heads HA and HB.

Figure 6:
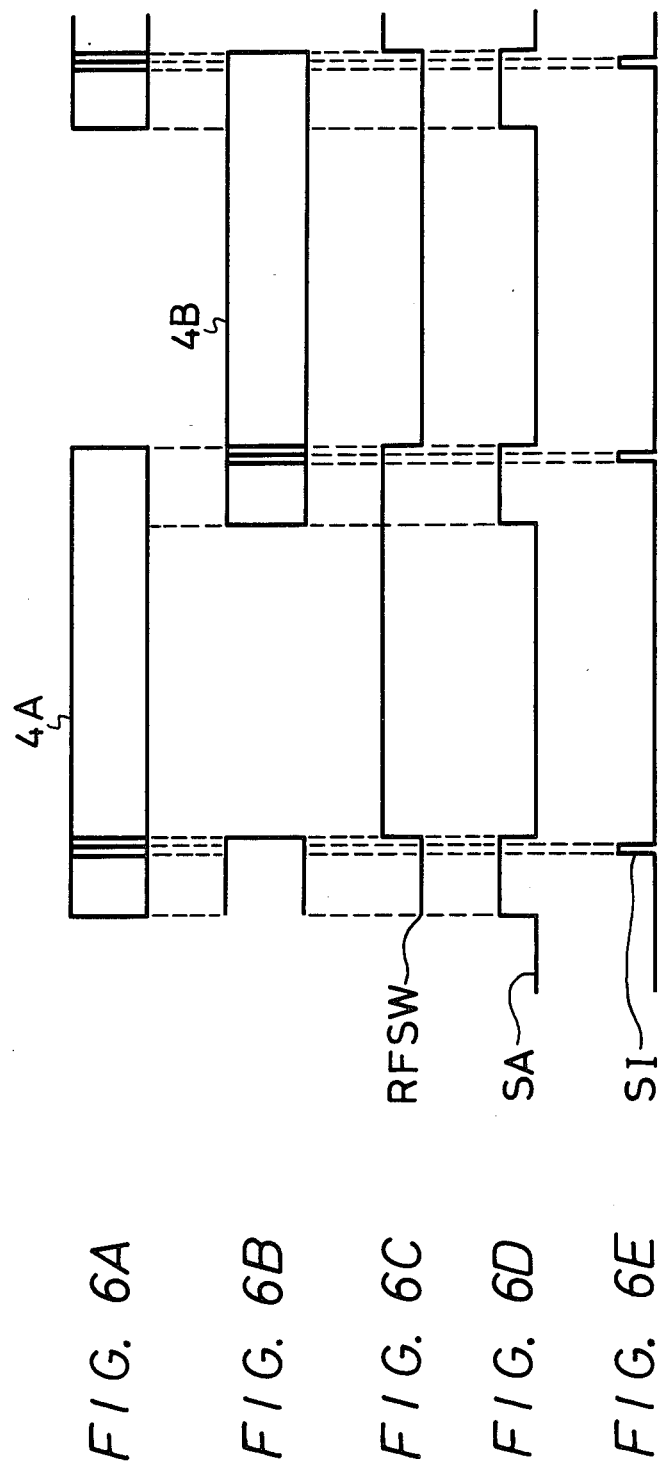
FIGS. 6A to 6E are timing diagrams to which reference will be made in explaining the relationship between switching of the rotary heads and the generation of index area signals.

A switch 34 is provided to select the timing of switching signal RFSW for a normal mode and a multi-PCM mode, respectively. More specifically, for the normal mode, the movable contact of switch 34 is engaged with a terminal N, at which time, a pulse PG having a frequency of 30 Hz and being generated from a pulse generator 43 and indicative of the absolute rotary phase of rotary heads HA and HB is supplied to a switching signal generating circuit 44 from which a square wave signal SC having a duty ratio of 50% is derived. This square wave signal SC is supplied, as is, through switch 34 to switching circuits 32 and 33 as the switching signal RFSW (FIG. 6C).

For the multi-PCM mode, the movable contact of switch 34 engages a terminal M so that, at that time, square wave signal SC from the switching signal generating circuit 44 is supplied through a phase shifter circuit 45 by which, in accordance with the segment track area specified, the square wave signal SC is phase-shifted by $36° \times (n-1)$, in which n is an integer corresponding to the segment track area number, for example, n=1 for the segment track area AP1, n=2 for AP2, . . . n=6 for AP6. The suitably phase-shifted signal from circuit 45 is supplied through switch 34 to switching circuits 32 and 33 as the switching signal RFSW for the multi-PCM mode. The switching signal RFSW is also supplied to a PCM audio signal processor 62 included in a PCM signal system 60 and which generates a PCM area signal indicative of the specified one of the segment track areas AP1–AP6.

The normal PCM recording mode of the apparatus of FIG. 8 will now be described, as follows:

An input video signal applied to an input terminal 51 is supplied to a video signal system 50 in which it is suitably processed. The output signal from video signal system 50 is then supplied to switching circuit 32. With switch 34 engaging its contact N for selecting the normal PCM mode, switching circuit 32 is alternately switched by switching signal RFSW at every half revolution of rotary heads HA and HB which are controlled by a drum phase servo taking the pulse PG as a reference phase so that when rotary head HA scans the area AV of a track 4A described before in connection with FIGS. 2 and 4, the video signal is supplied through a recording amplifier 46A and switching circuit 31A to rotary head HA and is thereby recorded on this area AV of the respective track 4A. In like manner, when rotary head HB scans the area AV of a track 4B, the video signal is supplied through a recording amplifier 46B and switching circuit 31B to rotary head HB and is thereby recorded on the area AV of the respective track 4B.

Left and right channel audio signals $AU_{in}$ applied to input terminals 61L and 61R are both supplied to PCM audio signal processor 62 and are therein processed to PCM data.

Figure 1:
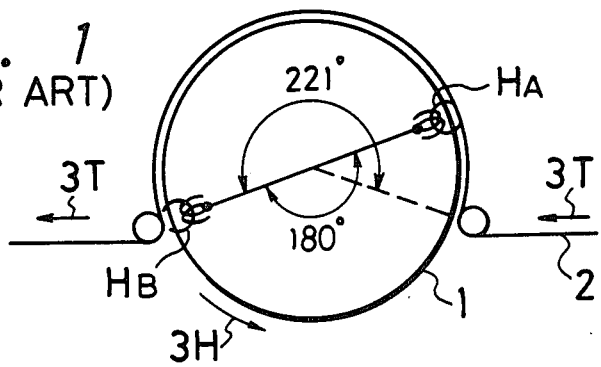
FIG. 1 is a schematic diagram showing a known rotary head assembly of a recording and/or reproducing apparatus to which the present invention may be advantageously applied.
Figure 2:
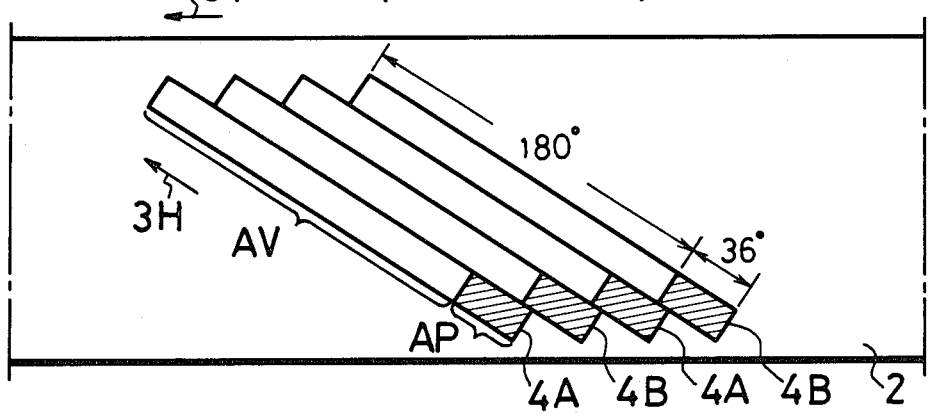
FIGS. 2 and 3 are schematic diagrams showing recording track patterns formed by the rotary head assembly of FIG. 1 for different recording modes thereof.

In other words, the audio signal is digitized, the resulting digital signal is divided into 132 blocks for each field period thereof, the parity words P and Q, each of which is an error correction code, are generated, and the CRC code is generated for each block. Then, the data of one field period is time compressed to about 1/5 its original duration by a PCM area signal formed on the basis of the switching signal RFSW, the block synchronizing signal SYNC and the block address signal ADRS are added to each block, each block is formed as the data series shown in FIG. 9 and this block is read as one of the blocks in the sequence shown in FIG. 7. The PCM data thus read are modulated to a signal having a frequency of 5.8 MHz if the data is "1" and to a signal having a frequency of 2.9 MHz if the data is "0". The modulated signal is supplied from PCM audio signal processor 62 through a switching circuit 35, whereby, in response to the changing-over of switching circuit 32 by switching signal RFSW, the modulated PCM audio signal is recorded in the area AP of a track 4A by rotary head HA and in the area AP of a track 4B by rotary head HB, as shown in FIG. 2.

Figure 3:
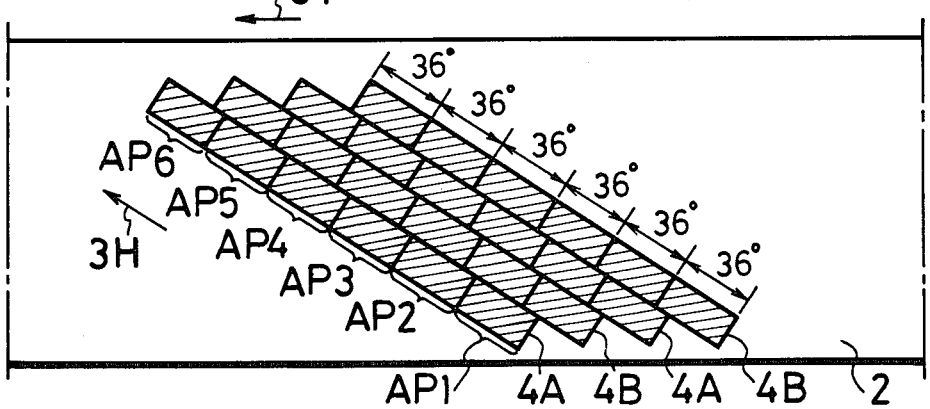

In the multi-PCM mode, the movable contact of switch 34 is engaged with its contact M to thereby allow phase shifter circuit 45 to generate a head switching signal RFSW whose phase is shifted by a whole multiple of 36° in accordance with a specified PCM area, and from which a PCM area specifying signal is derived. Accordingly, the PCM audio signal is recorded in a specified one of the segment track areas AP1 to AP6 shown in FIG. 3.

The reproducing mode of the apparatus will now be described. In the reproducing or playback mode, the rotary phase of the rotary drum is again servo-controlled on the basis of the pulse signal PG generated from pulse generator 43.

In the case of the 8 mm video tape recorder, tracking pilot signals (not shown) of a so-called 4 frequency system are cyclically recorded on each of the tracks 4A and 4B so that, during reproducing, tracking servo is effected with reference to the 4 frequency system tracking pilot signals.

In the playback mode, the reproduced signal outputs from rotary heads HA and HB are respectively supplied through playback amplifiers 47A and 47B to switching circuit 33. Switching circuit 33 is changed-over in response to switching signal RFSW so that the video signal from the area AV of each track is supplied to video signal system 50 and the PCM data from the area AP of each track is supplied to PCM signal system 60.

In video signal system 50, the video signal is demodulated and then delivered to an output terminal 52 as the video output $V_{out}$.

On the other hand, in PCM signal system 60, the reproduced PCM data is supplied through a playback equalizer circuit 63 and a limiter circuit 64 to a bit synchronizing circuit 65. This bit synchronizing circuit 65 is formed of a D-type flip-flop circuit 66 and a PLL (phase locked loop) circuit 67. From D-type flip-flop circuit 66, there is derived the data "1" or "0" modulated as mentioned before. The resulting data is supplied to PCM audio signal processor 62 in which it is error detected, error corrected and so on, and thereafter it is re-converted to left and right channel analog audio signals. These left and right channel analog audio signals $AU_{out}$ are provided at output terminals 68L and 68R, respectively.

The switching circuit 35 is changed over from its normal position engaging contact N to a position engaging a contact $I_{dx}$ during scanning of an index area. Further, a switching circuit 36 is adapted to selectively apply to contact $I_{dx}$ either an index signal or an erasing signal in response to a switching signal SW when the index signal is inserted or erased, respectively.

In the case of the illustrated example, the index signal is a single tone signal having a frequency of 2.9 MHz and which is generated by an oscillator 71. Further, in the illustrated example, the erasing signal is a single tone signal having a frequency of 5.8 MHz, and which is provided by an oscillator 72.

A circuit 80 is provided for generating an index area specifying signal. With the apparatus in its playback mode to reproduce the recorded signals, when a new index signal is written in a limited area between the postamble area 14 or 24 and the guard band area 15 or 25, or when the index signal is to be erased from such limited area, the index area specifying signal is generated by circuit 80, as follows:

Reproduced data S1 (FIGS. 9A and 9B) which is bit-synchronized and derived from D-type flip-flop circuit 66 in PCM signal system 60 is supplied to a demodulating circuit 81 and to a block synchronizing signal detecting circuit 82 in generating circuit 80. When the block synchronizing signal SYNC is detected in circuit 82, the latter generates a latch pulse S2 (FIG. 9C) at a time corresponding to the last bit of the address data ADRS demodulated by demodulating circuit 81. Then, the address data ADRS of 8 bits is latched in a latch circuit 83 by latch pulse S2. A latch output S3 (FIG. 9D) is supplied to a preset terminal of a counter 85.

The data demodulated by demodulator 81 is also supplied to an error detection circuit 84 in which any error is detected in every block through use of the CRC code. Since the CRC code is generated for the words including the address data ADRS upon recording, if the address data ADRS has an error, such error of the address data ADRS is detected.

The latch pulse S2 from block synchronizing signal detecting circuit 82 is also supplied to error detection circuit 84 as a calculation start pulse and thereby the calculation for error detection is initiated. When an absence of error is detected by circuit 84, the latter generates a pulse S4 (FIG. 9E). The counter 85 is loaded by this pulse S4 with the address value from latch circuit 83 which is preset in counter 85.

A clock pulse of one block period is supplied to counter 85 from a clock generator 86. Accordingly, once counter 85 is loaded and preset with the address value from latch circuit 83, even if the following data are all erroneous, counter 85 increments from its preset value at every data block in response to the clock pulse from generator 86. Needless to say, if a data block does not contain any error, the pulse S4 is generated by error detection circuit 84 in response to each such block so that the address data ADRS is preset in counter 85 for each block. At such time, the clock pulse is neglected by counter 85.

A counted value S5 (FIG. 9F) from counter 85 is supplied to a decoder 87 which detects when the counter value S5 becomes the last address of the data block, that is, the address 131, and then generates a detection pulse S6 (FIG. 9G). A monostable multivibrator 88 is triggered by detection pulse S6 to provide an index area signal S7 (FIG. 9H).

Alternatively, it may be possible that the decoder 87 generates the detection pulse S6 when the counted value S5 of counter 85 becomes, for example, "133" (taking a spare into consideration), rather than "131".

In either case, the obtained index area signal S7 is supplied as a switching signal to switching circuit 35 through a switching circuit 38 and a gate circuit 39 which will be described later so that switching circuit 35 is changed over from contact N connected with PCM audio signal processor 62 to contact $I_{dx}$ connected to switching circuit 36. At the same time, the index area signal S7 passed through the gate circuit 39 is supplied through OR gate 42 as a switching signal for recording and/or reproducing change-over switching circuits 31A and 31B with the result that, during the scanning of each index area, switching circuits 31A and 31B are engaged with the respective recording terminals REC.

Accordingly, when the index signal is to be inserted or recorded, switching circuit 36 is in the illustrated position for engaging its contact $I_{dx}$, and the index signal having the frequency of 2.9 MHz is recorded on a track being scanned in the limited area between its postamble area and its guard band area specified by index area S7. On the other hand, in the erasing mode, that is, when a previously recorded index signal is to be erased, switching circuit 36 is changed over to engage its contact $E_r$, that is, to the position opposite to that illustrated so that the erasing signal having the frequency of 5.8 MHz is supplied to the head HA or HB during the period specified by the index area signal S7 and thereby the previously recorded index signal is erased.

The gate circuit 39 controls the length of time during which index area signals S7 are allowed to pass therethrough for recording or inserting index signals or for erasing previously recorded index signals. The gate circuit 39 is opened by a gating or control signal GT for a period of from 3 to 10 seconds, which corresponds to the time for scanning several hundred tracks, and during which time the index signal is recorded in, or erased from each of the tracks in the area thereof determined by the index area S7. The control signal GT may be generated automatically or manually upon selection of one of the modes of the VTR.

In the embodiment being here described, when inserting or erasing of the index signal is carried out in the recording mode or in the playback mode, even if correct PCM data is not obtained, which includes the case where no PCM data exists, the index area signal can still be obtained.

In that case, the index area signal is formed from the switching signal RFSW. For this purpose, the switching signal RFSW (FIG. 9I) from switching circuit 34 is supplied to a rising and falling or zero-crossing detector 91 in which the leading and trailing edges of signal RFSW are detected. A monostable multivibrator 92 is triggered by each resulting detection pulse SD (FIG. 9J) to thereby generate a pulse M1 (FIG. 9K) having a duration providing a delay time corresponding to a period from the head switching or change-over point up to a time a little before the start of scanning of the postamble area 14 or 24. A monostable multivibrator 93 is triggered by the falling edge of pulse M1 to thereby generate an index area signal M2 (FIG. 9L). This index area signal M2 is supplied to another input terminal of switching circuit 38. The output pulse SD from rising and falling detector 91 is also supplied to a set terminal S of an SR flip-flop circuit 94 and to a reset terminal R of an SR flip-flop circuit 95. The Q output of flip-flop circuit 94 becomes "1" from the time when head switching occurs and a switching circuit 37 is turned ON or closed thereby. Then, the pulse S4 from error detection circuit 84 is supplied through closed switching circuit 37 to a set terminal S of SR flip-flop circuit 95. When no PCM data exists and error detection circuit 84 does not generate the pulse S4, the Q output of SR flip-flop circuit 95 becomes "0" so that switching circuit 38 is changed over to the position opposite to that illustrated. Thus, instead of the signal S7, the signal M2 is supplied through gate circuit 39 to switching circuit 35.

When PCM data exists and pulse S4 is generated by error detection circuit 84, SR flip-flop circuit 95 is set and thus the Q output thereof becomes "1" so that switching circuit 38 is disposed in the illustrated position. Accordingly, signal S7 is supplied through gate 39 to switching circuit 35 as the index area signal.

In both cases, flip-flop circuit 94 is reset by the index area signal S7 or M2 passed through gate circuit 39 and the Q output of flip-flop circuit 94 becomes "0" with the result that switching circuit 37 is turned OFF or opened.

Accordingly, in the normal recording mode, as distinguished from after-recording, signal M2 (FIG. 9L) is always obtained as the index area signal. When the index signal is to be written, the signal having the frequency of 2.9 MHz is recorded. Otherwise, the postamble signal having the frequency of 5.8 MHz is recorded. In this recording mode, generally the gate circuit 39 is always closed, and it is opened for the length of time (3 to 10 seconds) during which the above-mentioned index signal is to be written.

In the multi-PCM mode, which is established by changing over switch 34 to engage its contact M, it is possible to erase or insert the index signal in the same way as described above for the normal PCM mode.

When the index area signal M2 is formed from the switching signal RFSW, the timing of this index area signal M2 is selected to precede the timing of the index area signal constituted by the signal S7. The reason for this is as follows: When an error exists in the tracks in the longitudinal direction of the tracks, the video signal, if erased by reason of such error, can not be recovered. However, even if the PCM data is erased a little, such PCM data can be recovered by the error correction or interpolation.

In the above-described embodiment, since the postamble signal has the frequency of 5.8 MHz which also represents the binary code signal of "1", the signal having the frequency of 2.9 MHz which represents the binary code signal of "0" is used as the index signal. However, the index signal is not limited to such signal corresponding to the data of "0", but may be a signal having a pattern which does not appear as data.

Alternatively, it is possible to record as the index signal coding data which results from modulating predetermined data by "1" and "0". If the coding is carried out as described above, it is possible to record as the index signal data indicative of the starting point and the intermediate portion of a tune, and other various kinds of data, such as, data representing tape speed, time information and so on.

Further, the present invention is not limited to the case where an audio signal is pulse-code modulated and recorded and/or reproduced, but can be applied to apparatus for recording and/or reproducing any PCM data.

The modes in which the index signal may be written or recorded according to this invention are as follows:

(1) Auto recording mode

When a PCM data (which may contain video data) is being initially recorded on a normal blank tape, the index signal can be automatically recorded in the index area of each track for a period of several seconds from the starting point of the recording.

(2) After-recording mode

In synchronism with rewriting of the recorded PCM audio data, that is, so-called after-recording mode, the index signal is recorded in the index area of each track scanned for several seconds from the starting point of the recording.

(3) Other mode

While the previously recorded audio data is reproduced, only the index signal is rewritten or recorded anew.

The apparatus according to the invention in which the index area pulse is obtained with reference to the block address is especially significant for the mode described under (3) above.

In accordance with the present invention, as set forth above, when the index signal is being recorded in, or erased from a limited area following the portion of the track containing the PCM data while this PCM signal is being reproduced, the index area signal is formed on the basis of the address data in the PCM signal so that even if the recording track is displaced in the longitudinal direction thereof by skew, jitter, adjusting error and so on, the position of the index signal area is always precisely determined relative to the track of the PCM data. Accordingly, it is possible to avoid erasure of the PCM data by the index signal when the track timing is displaced in the longitudinal direction of the tape.

Although a single preferred embodiment of the invention has been described in detail with reference to the accompanying drawings, it will be apparent that the invention is not limited to that precise embodiment, and that many modifications and variations could be effected therein by one skilled in the art without departing from the spirit or scope of the invention as defined by the appended claims.

What is claimed is:

1. An apparatus for recording and/or reproducing, in successive slant tracks on a record tape, an information signal comprised of at least an audio signal and an index signal for use in controlling transportation of the tape, comprising:

audio signal processing means for converting an input audio signal to a digitized form in which the audio data for a predetermined length of time is grouped as a plurality of data blocks each including block address data for identifying the block number thereof;

transducer means connected to said audio signal processing means for recording and/or reproducing said grouped data blocks containing the digitized audio signal for said predetermined length of time in a first part of a respective slant track on the tape;

index signal generating means for generating an index signal of a predetermined frequency;

index area signal generating means including means for detecting said block address data from the grouped data blocks recorded in said first part of a respective slant track, and means responsive to the detected block address data for providing an index area signal in predetermined timed relation to scanning of said first part by said transducer means; and control means responsive to said index area signal for supplying said index signal to said transducer means for recording by the latter in a second part of said respective slant track which is precisely located adjacent an end of said first part of said respective slant track.

2. The apparatus according to claim 1; further comprising means for generating an erasing signal; and means for supplying said erasing signal to said control means in place of said index signal so that said transducer means employs said erasing signal in response to said index area signal for erasing an index signal previously recorded in said second part of a slant track.

3. The apparatus according to claim 2; in which said erasing signal has a frequency substantially higher than said predetermined frequency of the index signal.

4. The apparatus according to claim 3; further comprising means permitting application of said index area signal to said control means over a period of time corresponding to the scanning of a number of said slant tracks by said transducer means, whereby an index signal is recorded in, or erased from said second part of each of said number of slant tracks scanned during said period of time.

5. The apparatus according to claim 4; in which said transducer means includes rotary head means; and in which said index area signal generating means further includes means for generating a signal indicative of a rotary phase of said rotary head means, and means for providing said index area signal from said signal indicative of the rotary phase of the rotary head means upon the absence of said detected block address data.

6. The apparatus according to claim 1; further comprising means permitting the application of said index area signal to said control means over a period of time corresponding to the scanning of a number of said slant tracks by said transducer means, whereby an index signal is recorded in said second part of each of said number of slant tracks during said period of time.

7. The apparatus according to claim 1; in which said transducer means includes rotary head means; and in which said index area signal generating means further includes means for generating a signal indicative of a rotary phase of said rotary head means, and means for providing said index area signal from said signal indicative of the rotary phase of the rotary head means upon the absence of said detected block address data.

8. The apparatus according to claim 7; further comprising video signal processing means, and means for applying a processed video signal to said rotary head means for recording by the latter in a third part of each of the slant tracks which is in following relation to said second part of the respective track; and in which said index area signal generating means initiates said index area signal provided from said signal indicative of the rotary phase in advance of said index area signal provided in response to said detected block address data.

* * * * *